(12) United States Patent
    Wen

(10) Patent No.:     US 10,815,313 B2
(45) Date of Patent:     *Oct. 27, 2020

(54) METHOD FOR PREPARING A CELLULOSE SPONGE

(71) Applicant: SHANXI PISHON BIOMEDICAL TECHNOLOGY CO., LTD, Jincheng (CN)

(72) Inventor: Sheng-Tung Wen, Taipei (TW)

(73) Assignee: SHANXI PISHON BIOMEDICAL TECHNOLOGY CO., LTD, Jincheng, Shanxi (CN)

( * ) Notice: Subject to any disclaimer, the term of this patent is extended or adjusted under 35 U.S.C. 154(b) by 212 days.

This patent is subject to a terminal disclaimer.

(21) Appl. No.: 15/482,828

(22) Filed: Apr. 10, 2017

(65) Prior Publication Data

US 2018/0148515 A1     May 31, 2018

(30) Foreign Application Priority Data

Nov. 25, 2016 (CN) .......................... 2016 1 1054226

(51) Int. Cl.
    *C08B 15/00*     (2006.01)
(52) U.S. Cl.
    CPC .................................. *C08B 15/005* (2013.01)
(58) Field of Classification Search
    CPC .................................................... C08B 15/005
    USPC .................................................... 536/95, 124
    See application file for complete search history.

(56) References Cited

U.S. PATENT DOCUMENTS

| 3,692,562 | A | * | 9/1972 | Kawata et al. | ......... | A61J 3/005 |
|           |   |   |        |              |           | 428/407    |
| 4,938,901 | A | * | 7/1990 | Groitzsch    | ............... | A61F 13/44 |
|           |   |   |        |              |           | 264/101    |
| 6,372,333 | B1 | * | 4/2002 | Sugiyama   | ............ | A43B 17/003 |
|           |   |   |        |              |           | 428/292.1  |
| 8,283,028 | B2 | * | 10/2012 | Yue        | .......................... | A61L 27/20 |
|           |   |   |        |              |           | 428/315.5  |
| 2008/0016641 | A1 | * | 1/2008 | Armaly    | .................... | A47L 13/12 |
|           |   |   |        |              |           | 15/244.4   |
| 2014/0080214 | A1 | * | 3/2014 | Nugraha   | .............. | C12N 5/0068 |
|           |   |   |        |              |           | 435/395    |
| 2014/0313265 | A1 | * | 10/2014 | Himura   | ................ | B41J 2/17563 |
|           |   |   |        |              |           | 347/85     |

OTHER PUBLICATIONS

Yue et al.reference ("Preparation of three-dimensional interconnected macroporous cellulosic hydrogels for soft tissue engineering," Biomaterials 31 (2010) pp. 8141-8152) (Year: 2010).*

* cited by examiner

*Primary Examiner* — Shaojia A Jiang
*Assistant Examiner* — Everett White
(74) *Attorney, Agent, or Firm* — Hannah Tien

(57) ABSTRACT

A method for preparing a cellulose sponge, comprising: (A) providing a solution of hydroxypropyl cellulose having a self-crosslinkable substituent; and (B) adding an initiator and a catalyst into the solution of hydroxypropyl cellulose having the self-crosslinkable substituent for crosslinking, wherein a method for preparing the hydroxypropyl cellulose having the self-crosslinkable substituent comprises: (a) dissolving hydroxypropyl cellulose in dimethylformamide to form a hydroxypropyl cellulose solution; (b) dissolving a compound comprising the self-crosslinkable substituent in dimethylformamide and slowly adding it drop by drop into the hydroxypropyl cellulose solution; (c) adding an alcohol for reaction; and (d) reacting and drying at room temperature to form the hydroxypropyl cellulose having the self-crosslinkable substituent.

10 Claims, 5 Drawing Sheets

METHOD FOR PREPARING A CELLULOSE SPONGE

The present application claims priority to Chinese Patent Application No. 201611054226.5 filed on 25 Nov. 2016, incorporated herein by reference in its entirety.

FIELD OF THE INVENTION

The present invention relates to a method for preparing a cellulose sponge.

BACKGROUND OF THE INVENTION

Cell culture and tissue engineering are critical technologies in regenerative medicine, which provides sufficient cells for experimental analysis through large-scale proliferation by artificial means, and then conditions required for the growth and development of tissue cells are stimulated and provided, thereby enabling cells obtained by culture to grow and differentiate into cells or tissues with specific characteristics.

Regenerative medicine provides solutions to problems such as uncertainties of organ donation and potential graft rejections due to immune responses following organ transplantation. However, its development is limited by a few techniques, for example, cell culture and three dimensional scaffolds.

In the field of biological cells, it is generally believed that the biomimetic activity of a three-dimensional culture is better than that of a two-dimensional monolayer culture. A number of three-dimensional cell culture methods have thus developed, such as a hydrogel culture, a suspension culture, a hanging drop culture, a micromass culture, and a nonadherent substrate. In the field of cell culture, in order for the cultured cells to grow into tissues or organs with desired functions and forms, the use of scaffolds plays an important role. The function of the scaffold is to provide a three-dimensional framework suitable for cell growth, which is commonly known as a three-dimensional scaffold. It has a large number of pores for cell attachments or inoculations, guiding the cells to grow and differentiate in three-dimensional directions as planned to produce simulated and regenerated tissues or organs.

In traditional flat cell culture, there is only a very small area of contact between cells, half of the surface area of a cell is in contact with the culture plate, and the other half is in contact with the culture medium. A three-dimensional culture environment provides other advantages, it is capable of: providing better biochemical signals to direct cell functions, allowing cell migration within the scaffold, increasing cell density and increasing signal transmission among cells, providing molecules for cell attachments and for inducing cell differentiation. When the pore size of a sponge-like three-dimensional scaffold is greater than 50 µm, cell migration is enhanced and more uniform distribution of seeded cells and nutrients are facilitated by the inter-connecting porous structure.

Therefore, one of the important issues in the field is to provide a method and a device for preparing a three-dimensional scaffold, which can achieve the purpose of preparing the three-dimensional scaffold in a simple manner with simple devices, allowing cells to be cultivated stably and grow eventually into tissues or organs with desired functions and forms.

In view of the foregoing, an object of the present invention is to provide a method for preparing a cellulose sponge, which can achieve the purpose of preparing the three-dimensional scaffold in a simple manner and in a solution, thereby simplifying the complicated process for preparing the scaffold and shortening the required preparation time.

SUMMARY OF THE INVENTION

Figure 1:
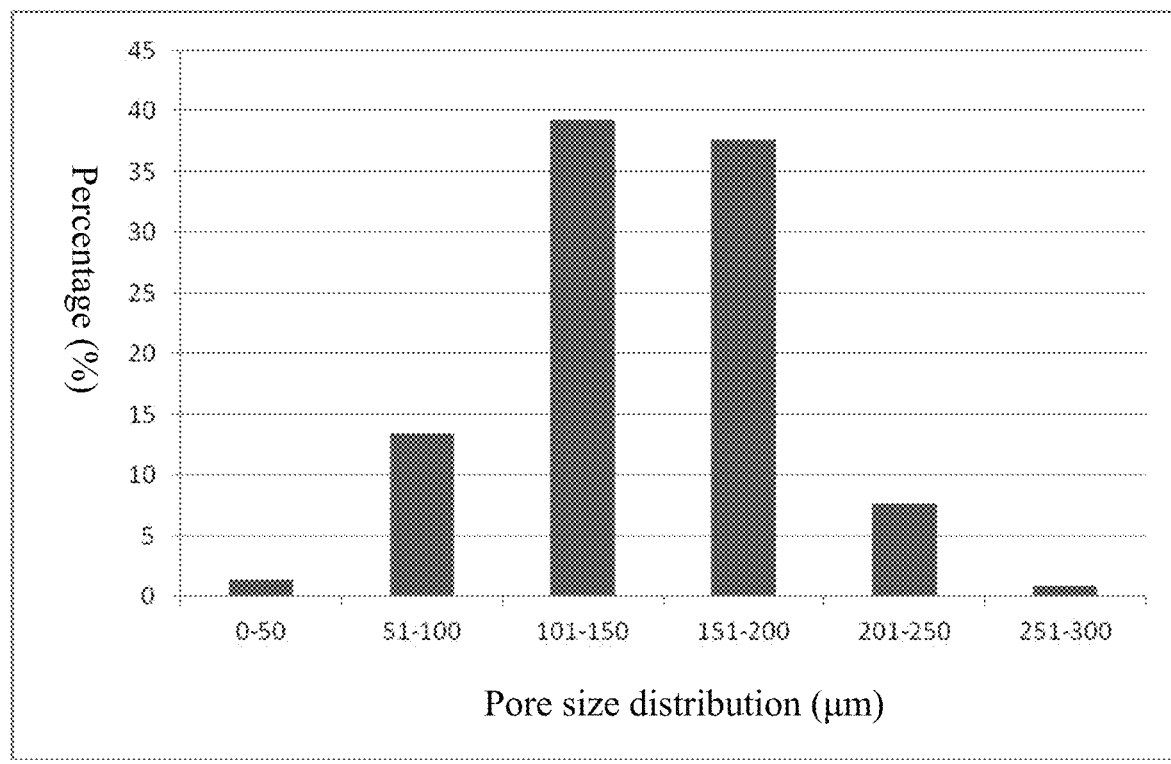
FIG. 1 is a diagram showing the pore size distribution of the cellulose sponge with additionally added alcohol of the present invention.

The present invention provides a method for preparing a cellulose sponge, comprising: (A) providing a solution of hydroxypropyl cellulose having a self-crosslinkable substituent; and (B) adding an initiator and a catalyst into the solution of hydroxypropyl cellulose having the self-crosslinkable substituent for crosslinking, wherein a method for preparing the hydroxypropyl cellulose having the self-crosslinkable substituent comprises: (a) dissolving hydroxypropyl cellulose in dimethylformamide to form a hydroxypropyl cellulose solution; (b) dissolving a compound comprising the self-crosslinkable substituent in dimethylformamide and slowly adding it drop by drop into the hydroxypropyl cellulose solution; (c) adding an alcohol for reaction; and (d) reacting and drying at room temperature to form the hydroxypropyl cellulose having the self-crosslinkable substituent.

DETAIL DESCRIPTION OF THE INVENTION

Unless otherwise specified, "a" or "an" means "one or more".

The term "cellulose sponge" as used herein includes a three-dimensional structure of any shape, size, or composition, which can be used as a structure for attachment, adherence or implantation of at least one kind of cell and can serve the purpose of promoting normal cell growth and/or proliferation and/or differentiation. In one embodiment of the present invention, since the cellulose sponge prepared by the method disclosed in the present invention is oriented for medical use, the cellulose sponge is preferably used in a biocompatible manner. In another embodiment of the present invention, the cellulose sponge prepared by the method disclosed in the present invention is used for cell culture and the cellulose sponge has high air permeability and nutrient permeability (i.e., a better specific surface area).

The term "initiator" as used herein indicates a kind of compound which is easily decomposed into free radicals by heat or light and triggers polymerization of monomers. It can be used to trigger free radical polymerization and copolymerization of the unsaturated chain of monomers. It also can be used in cross-linking reaction for unsaturated polymer.

The present invention provides a method for preparing a cellulose sponge, comprising: (A) providing a solution of hydroxypropyl cellulose having a self-crosslinkable substituent; and (B) adding an initiator and a catalyst into the solution of hydroxypropyl cellulose having the self-crosslinkable substituent for crosslinking, wherein a method for preparing the hydroxypropyl cellulose having the self-crosslinkable substituent comprises: (a) dissolving hydroxypropyl cellulose in dimethylformamide to form a hydroxypropyl cellulose solution; (b) dissolving a compound comprising the self-crosslinkable substituent in dimethylformamide and slowly adding it drop by drop into the hydroxypropyl cellulose solution; (c) adding an alcohol for reaction; and (d) reacting and drying at room temperature to form the hydroxypropyl cellulose having the self-crosslinkable substituent.

According to the method of the present invention, in one preferred embodiment, the compound comprising the self-crosslinkable substituent comprises but is not limited to allyl isocyanate, methacrylic acid, acrylic acid, or glycidyl methacrylate.

According to the method of the present invention, in one preferred embodiment, the volume of the alcohol is 1.5-50% of the total volume of the dimethylformamide; in another preferred embodiment, the volume of the alcohol is 7.5-40% of the total volume of the dimethylformamide; in yet another preferred embodiment, the volume of the alcohol is 10-35% of the total volume of the dimethylformamide.

According to the method of the present invention, in one preferred embodiment, the alcohol comprises but is not limited to methanol, ethanol, propanol or butanol.

According to the method of the present invention, in one preferred embodiment, the initiator is persulfate initiator; and the catalyst is organic amine catalyst. In another preferred embodiment, the persulfate initiator comprises but is not limited to sodium persulfate, ammonium persulfate or potassium persulfate; and the organic amine catalyst comprises but is not limited to N,N,N',N'-tetramethylethylenediamine (TEMED), N,N,N',N'-tetrakis(2-hydroxypropyl) ethylenediamine (TKHED), N,N,N',N'-tetramethyl-3-(10H-phenothiazin-10-yl)-1,2-propanediamine, N,N,N',N'-tetramethylpregn-5-ene-3β,20α-diamine, N,N,N',N'-tetramethyl-1,4-butanediamine, 4,4'-tetramethyldiaminodiphenylmethane, N,N,N',N'-tetramethyl-1,4-benzenediamine or N,N,N',N'-tetramethyl-1,4-napthalenediamine.

Examples

The examples below are non-limiting and are merely representative of various aspects and features of the present invention.

Preparation of Cellulose Sponge

Preparation of the cellulose sponge with additionally added alcohol of the present invention was divided into two steps:

1. Synthesis of Hydroxypropyl Cellulose Having a Substituent:
   (1) Hydroxypropyl cellulose (HPC) ($M_n \approx 10,000$) was dehydrated by azeotropic distillation in toluene.
   (2) 3.6 g dehydrated HPC was dissolved in 200 ml of dimethylformamide (DMF);
   (3) 4.18 ml of allyl isocyanate was dissolved in 5 ml of dimethylformamide and then was slowly added drop by drop to the above prepared hydroxypropyl cellulose solution;
   (4) 24.6 ml of alcohol (such as propanol) was added for reaction, the volume of the alcohol is 12% of the total volume of dimethylformamide (dimethylformamide 205 ml×12%=24.6 ml, the volume ratio of dimethylformamide:alcohol=8.3:1);
   (5) One drop of dibutyltin dilaurate was added as a catalyst;
   (6) Stirred at room temperature for 48 hours;
   (7) The volume was reduced by using a rotatory evaporator and then the polymer was separated by ether; and
   (8) The reaction products were collected by vacuum filtration and precipitated into diethyl ether; the residual impurities were removed by Soxhlet extraction from diethyl ether to form hydroxypropyl cellulose having the substituent.

2. Solidification Process
   (1) Hydroxypropyl cellulose having a substituent in dry form was formulated into a 10 wt % aqueous solution and placed in a glass tube (diameter 10 mm×height 50 mm);
   (2) 1.2 g of ammonium persulfate (APS) and 35 µL of tetramethylethylenediamine (TEMED) were added into the solution under the condition of 2-8° C.;
   (3) The glass tube was placed in low temperature (−20° C.) for the reaction for 24 hours; and
   (4) The glass tube was moved to the room temperature for the reaction for 48 hours, the finish product was obtained after washing and freeze-drying.

The method for preparing the cellulose sponge without additionally added alcohol of the present invention was the same as described above, except that no alcohol was additionally added in step 1, i.e., step (4) of step 1 was skipped.

Appearance and Pore Size Measurement of Cellulose Sponge

The diameter and thickness of the cellulose sponge with additionally added alcohol in dry form and in wet form were measured, and the results were shown as in Table 1.

TABLE 1

| Appearance and size of the cellulose sponge with additionally added alcohol | | |
|---|---|---|
| | Diameter | Thickness |
| In dry form | 9.0 mm | 1.0 mm |
| In wet form | 9.0 mm | 1.0 mm |

As shown in Table 1, the diameter of the cellulose sponge with additionally added alcohol was 9 mm, which would be suitable to be placed in 48-well plates and easy to be used with ordinary cell culture devices. The thickness of the cellulose sponge with additionally added alcohol was 1 mm, which would avoid the problem of being too thick for an optical microscope to perform a preliminary observation. Therefore, the cellulose sponge with additionally added alcohol would be easier to be used with commonly available cell culture devices.

Software image J was subsequently used for statistical analysis of the pore size of the cellulose sponge with additionally added alcohol; the results were shown in FIG. 1 and Table 2.

TABLE 2

Pore size distribution of cellulose sponge with additionally added alcohol of the present invention
Pore size distribution

| Pore size range (μm) | Percentage % |
|---|---|
| 0-50 | 1.4 |
| 51-100 | 13.4 |
| 101-150 | 39.2 |
| 151-200 | 37.6 |
| 201-250 | 7.6 |
| 251-300 | 0.8 |

By analyzing pore sizes, it was found that the pore size of the cellulose sponge with additionally added alcohol was majorly in 50~250 μm, pores of this size would provide cells with an appropriate growth environment. Limiting the size of the pore to certain degree would limit the size of a cell cluster, thereby avoiding distortion of the three-dimensional structure of the cells due to oversized pores, or cell death in the center of a cluster due to the oversized cell cluster.

Structure of Cellulose Sponge

A cellulose sponge in dry form was placed on a dish, and the pore morphology was observed by using an optical microscope. With respect to the wet form, the cellulose sponge was first soaked in deionized water, and then the pore morphology after one day of soaking was observed by using an optical microscope.

Figure 2:
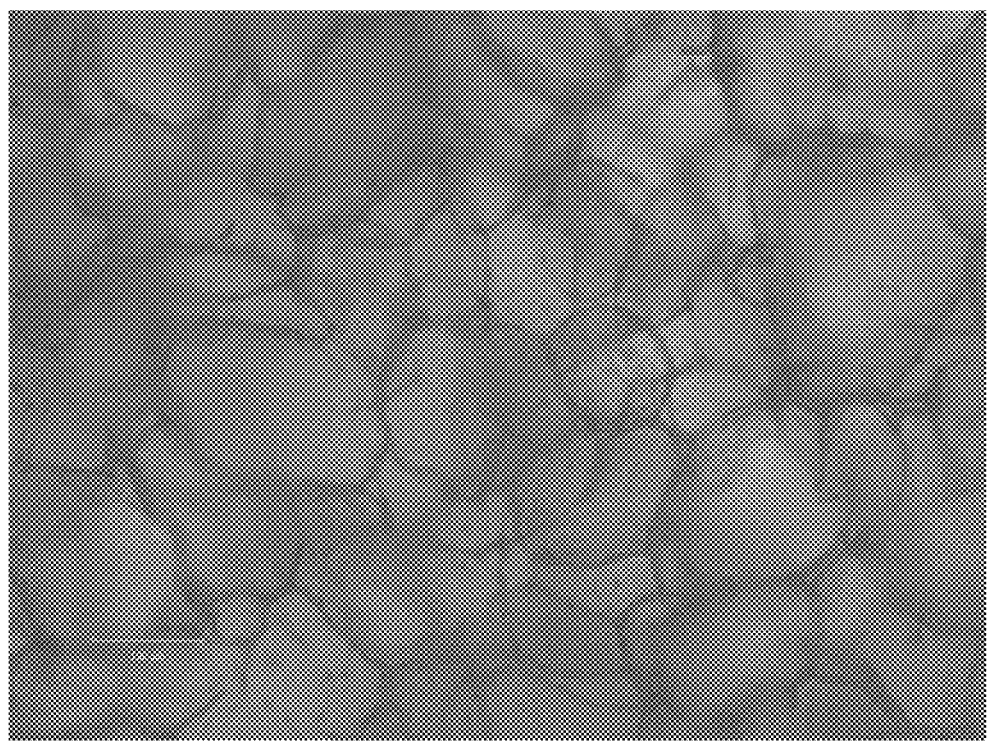
FIG. 2 is a magnified optical microscopy image of the cellulose sponge with additionally added alcohol of the present invention in dry form.
Figure 3:
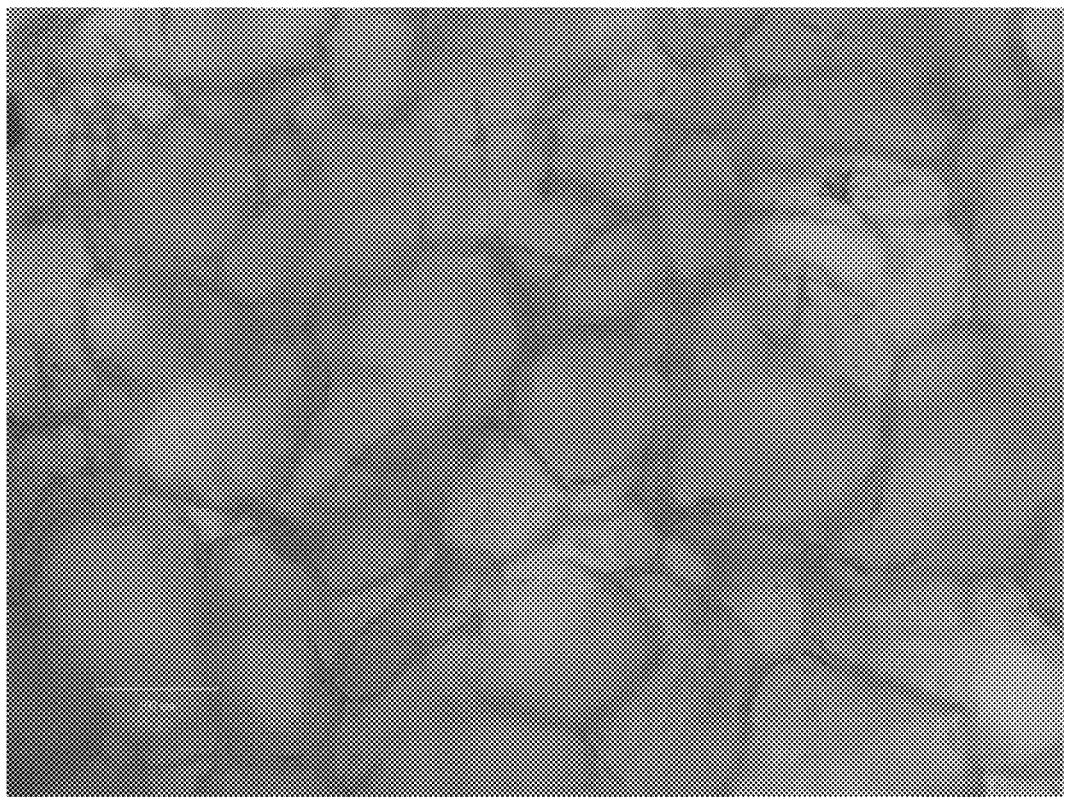
FIG. 3 is a magnified optical microscopy image of the cellulose sponge with additionally added alcohol of the present invention in wet form.

FIGS. 2 and 3 show optical microscopy images of the cellulose sponge with additionally added alcohol of the present invention in dry form as well as in wet form, indicating that the pore morphology in the dry form and the wet form are similar. The structure of the pore wall was not affected after water was being added, which suggested that the pore morphology of the cellulose sponge with additionally added alcohol of the present invention was highly stable.

Figure 4:
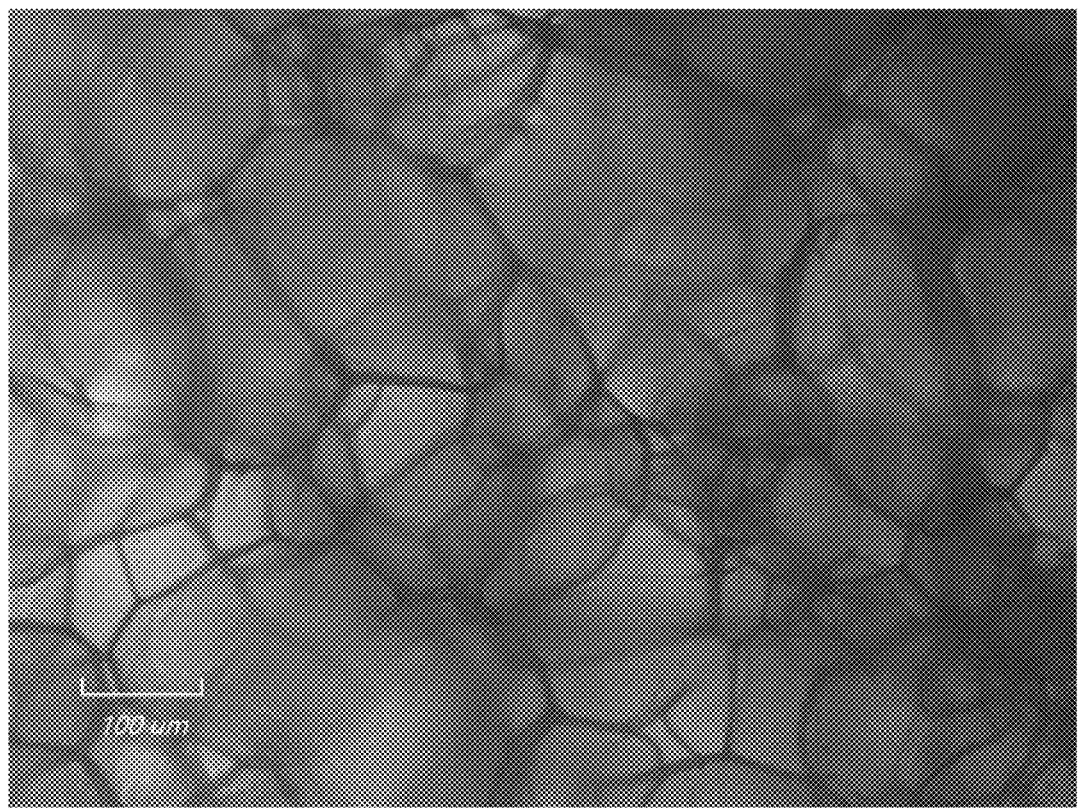
FIG. 4 is a magnified optical microscopy image of the cellulose sponge according to the present invention but without additionally added alcohol in dry form.
Figure 5:
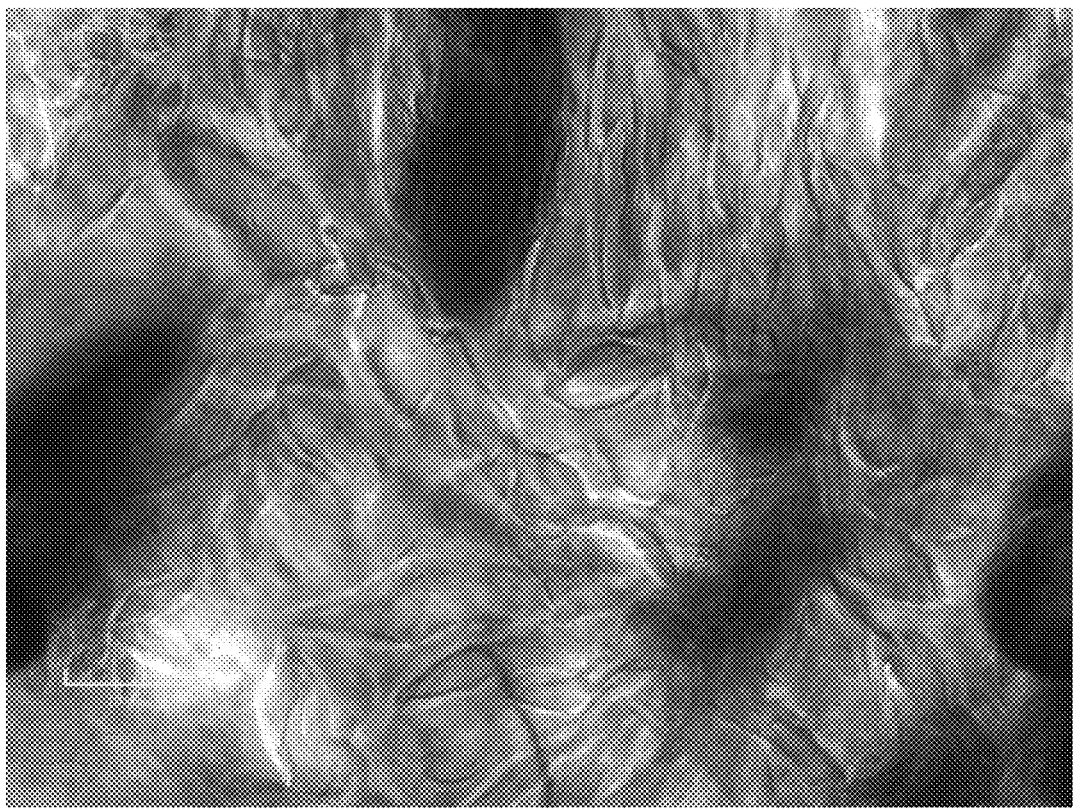
FIG. 5 is a magnified optical microscopy image of the cellulose sponge according to the present invention but without additionally added alcohol in wet form.

FIGS. 4 and 5 show optical microscopy images of the cellulose sponge according to the present invention but without additionally added alcohol in dry form as well as in wet form, indicating that the structure of the pore wall of the cellulose sponge without additionally added alcohol in wet form was affected by water absorption. The width of the pore wall was increased, which further reduced the pore volume. Furthermore, from the figures it is shown that the inner air bubbles were hardly leaked. This disadvantage would lead the cellulose sponge without additionally added alcohol suspended in the medium and further affect the cell growth. Accordingly, the stability of the pore morphology of the cellulose sponge according to the present invention but without additionally added alcohol was poor.

Applications of Cellulose Sponge

Cell culture conditions: HepG2 cells (human liver cancer cells), the medium was the high glucose Dulbecco's modified Eagle's medium (DMEM) supplemented with 10% fetal bovine serum, the cultivation conditions were 37° C. and 5% $CO_2$.

Step for inoculating cells: The cellulose sponge was placed in a 48-well plate, cell concentration of HepG2 was adjusted to $5 \times 10^6$ cells/ml, 60 μL was taken to be inoculated in the cellulose sponge, and after being placed in an incubator for 4 hours the cellulose sponge was removed from the incubator and 500 μL of culture medium was added. Subsequently the cellulose sponge was washed with phosphate buffer saline solution every three days and the fresh culture medium was added.

Figure 6:
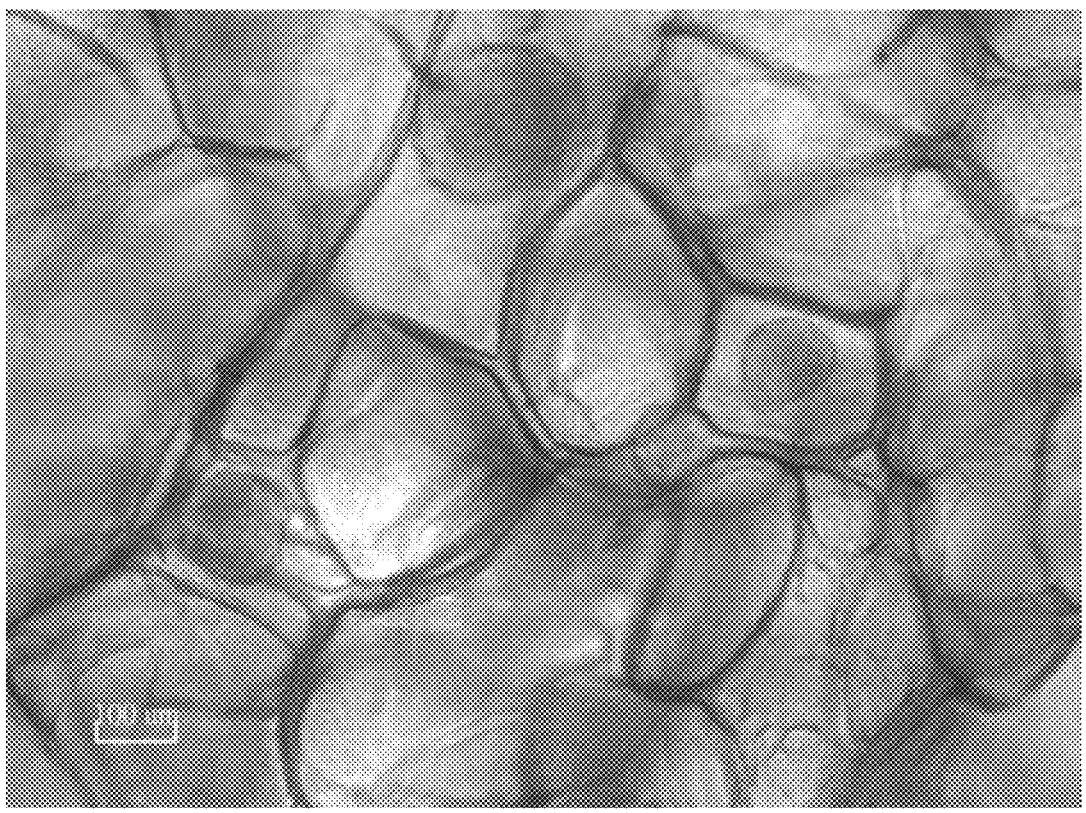
FIG. 6 is a magnified optical microscopy image of the cellulose sponge with additionally added alcohol of the present invention after cells being seeded.
Figure 7:
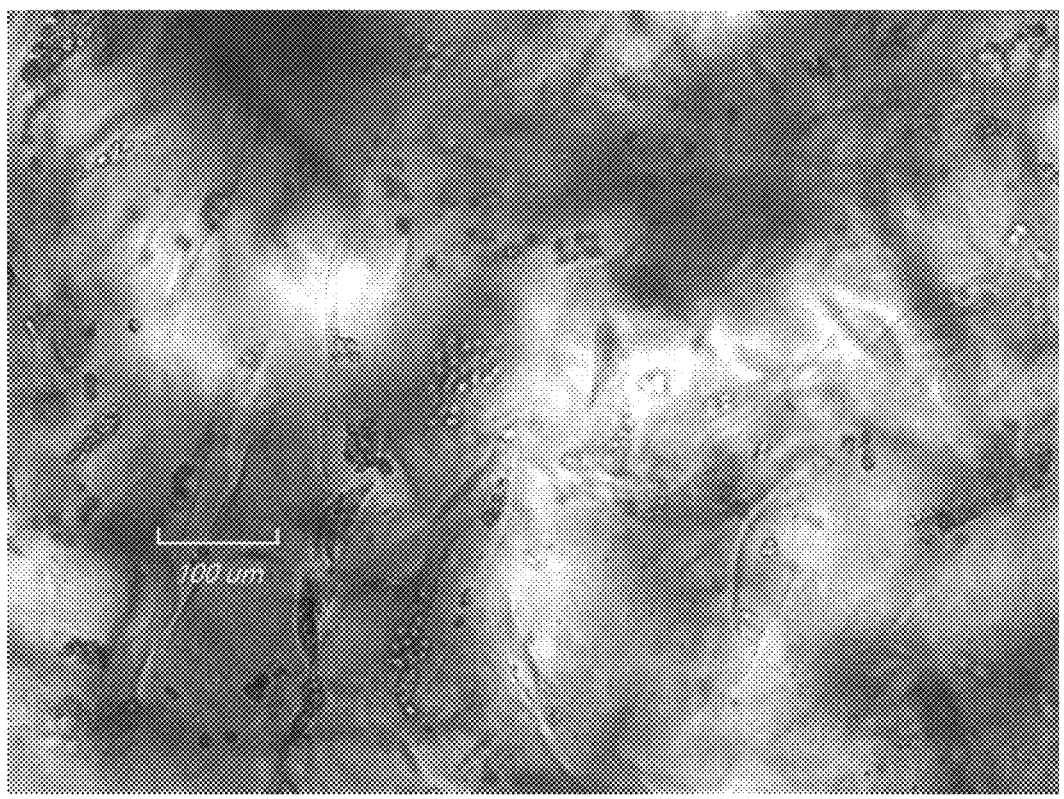
FIG. 7 is a magnified optical microscopy image of the cellulose sponge according to the present invention but without additionally added alcohol after cells being seeded.

FIGS. 6 and 7 are images observed 24 hours after HepG2 were seeded, FIG. 6 is the cellulose sponge with additionally added alcohol; FIG. 7 is the cellulose sponge without additionally added alcohol. They are magnified images observed the next day after HepG2 were inoculated using an optical microscope. It was found that, with respect to the cellulose sponge with additionally added alcohol of the present invention (FIG. 6), after the cells were inoculated the structure of the pore morphology was maintained and the cells were in a spheroid form, close to the actual pattern of the liver cells in human body. With respect to the cellulose sponge according to the present invention but without additionally added alcohol (FIG. 7), after cells were inoculated the structure of the pore morphology was not maintained, the pore was in spindle-shaped and the pore size was significantly reduced, and the cells inclined to apoptosis. Therefore, it suggested that the pore morphology significantly affected the cell morphology.

Scanning Electron Microscopy Images of Cellulose Sponge Cross-Sectional Structure Method for preparing samples for scanning electron microscopy: After being wetted with deionized water, the cellulose sponge with additionally added alcohol was dehydrated with graded alcohols (50%, 70%, 90%, 100%), and finally treated with hexamethyldisilazane (HMDS), dried in a chemical fume hood.

Step for scanning electron microscopy: The prepared cellulose sponge was fixed on a carrier having an adhered conductive carbon gel, the surface was sputter coated with gold, and then the carrier was placed in a cavity under vacuum. Highly magnified scanning electron microscopy images were captured by using a computer.

Figure 8:
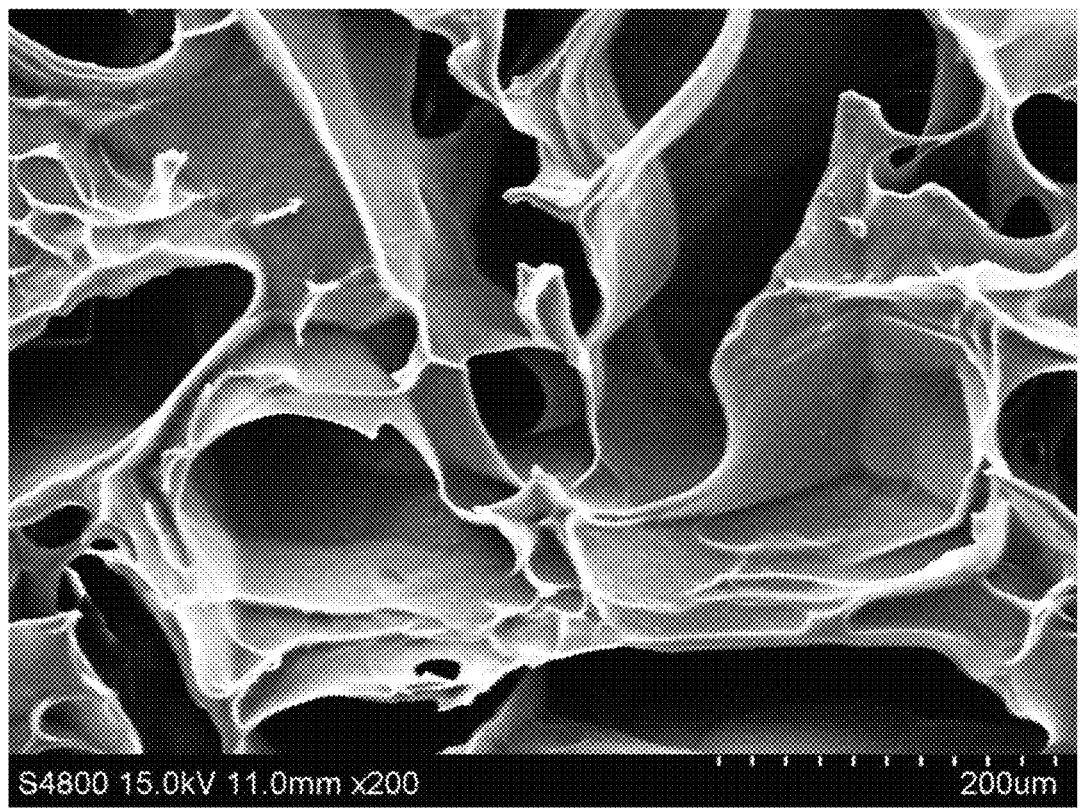
FIG. 8 is a scanning electron microscopy image of the cross-section of the cellulose sponge with additionally added alcohol of the present invention.

FIG. 8 is a scanning electron microscopy image of a cross-section of a cellulose sponge with additionally added alcohol, which indicated that the interior structure was an interconnected porous structure beneficial for cell growth therein. The porous structure not only provided an environment for cell growth and cell migration paths, allowed delivery of nutrients or signals to the cells in the interior of the cellulose sponge through the pores, but also provided channels to dispose metabolic wastes generated by the cells out of the cellulose sponge. Therefore, the porosity of the cellulose sponge provided an environment that was suitable for cell growth.

Confocal Microscopy of Cellulose Sponge Cross-Sectional Structure

Step for inoculating cells: The cellulose sponge with additionally added alcohol was placed in a 48-well plate, cell concentration of HepG2 was adjusted to $5 \times 10^6$ cells/ml, 60 μL was taken to be inoculated in the cellulose sponge, and after being placed in an incubator for 4 hours the cellulose sponge was removed from the incubator and 500 μL of culture medium was added. Washed with phosphate buffer saline solution after two days and then fresh culture medium was added.

Preparation of fluorescent dye: The fluorescent dye was formulated in compliance with the standard preparation procedure for fluorescent dyes, using the LIVE/DEAD® Viability/Cytotoxicity Assay Kit (Molecular Probes). 20 μL of 2 mM EthD-1 stock solution and 5 μL of 4 mM calcein AM stock solution were added to 10 ml of phosphate buffer saline solution, the fluorescent dye was produced after the mixture was homogenized.

Method for preparing samples for confocal microscopy: A cellulose sponge with additionally added alcohol was placed in a multi-well plate, 200 μL of fluorescent dye was added to each piece of cellulose sponge, reacted at room temperature for 30 minutes. The cellulose sponge was washed with phosphate buffer saline solution for several times and then the fluorescent dye was removed.

Step for using confocal microscope: The prepared cellulose sponge with additionally added alcohol was placed on a slide; a confocal microscope was used to observe red fluorescence and green fluorescence to determine whether the cells survived.

Figure 9:
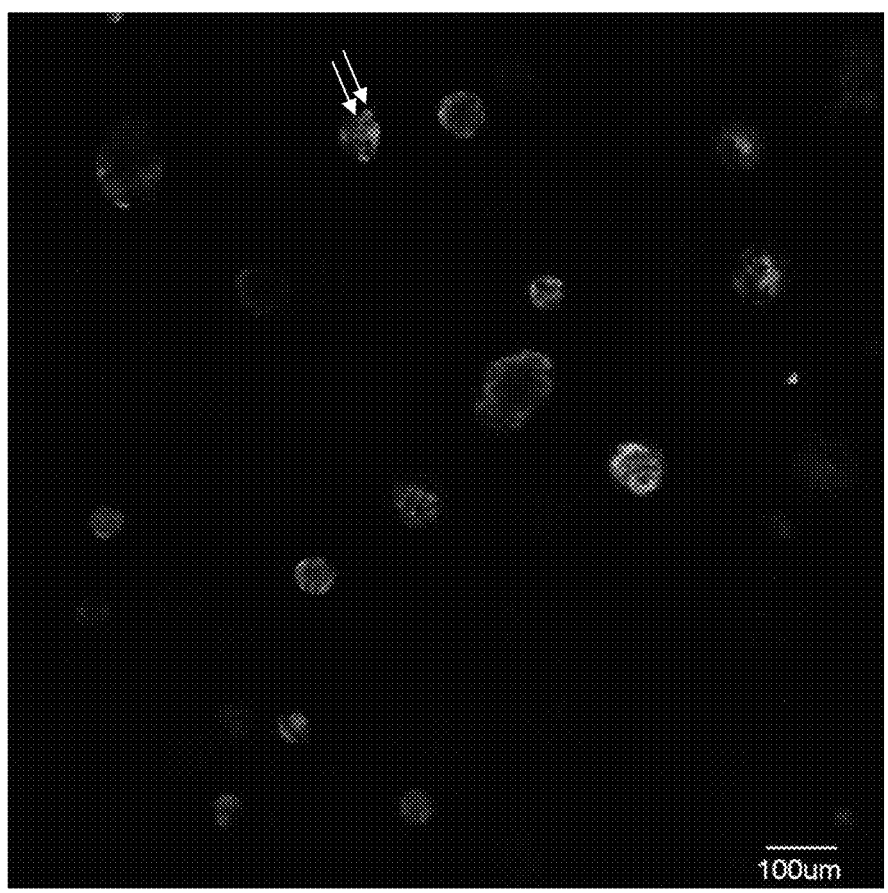
FIG. 9 is a confocal microscopy image of a cross-section of the cellulose sponge with additionally added alcohol of the present invention containing cells cultured therein.

FIG. 9 is a confocal microscopy image of a cross-section of a cellulose sponge with additionally added alcohol, which shows the result of the cellulose sponge after being cultivated for 3 days. The cell viability was determined by the fluorescent color. Green represented living cells, and red represented dead cells. As shown in the image, for those cells cultivated in the cellulose sponge with additionally added alcohol, most of them were in green (without arrows), very few of them were in red (at the arrows). Therefore, the survival rate was high after being cultivated for three days.

Cell Viability when Cultivated in Cellulose Sponge

Step for inoculating cells: The cellulose sponge with additionally added alcohol was placed in a 48-well plate, cell concentration of HepG2 was adjusted to $5 \times 10^6$ cells/ml, 60 μL was taken to be inoculated in the cellulose sponge, and after being placed in an incubator for 4 hours the cellulose sponge was removed from the incubator and 500 μL of culture medium was added. The cellulose sponge was washed with phosphate buffer saline solution every three days and then fresh culture medium was added.

Type of reagents used: Cell viability was quantified by using CELLTITER-GLO® 3D Cell Viability Assay (Promega). The reagent was completely formulated by mixing the CELLTITER-GLO® 3D reagent with a culture medium at a 1:1 ratio by volume.

200 μL of the mixed reagent was added to each piece of cellulose sponge. After 30 minutes of reaction, the luminescence data were read and recorded in relative luminescence units (RLUs). Higher RLUs indicated a better cell survival rate. The results are shown in Table 3.

TABLE 3

| | Cell viability | |
|---|---|---|
| | Cellulose sponge with additional added alcohol (RLU) | Cellulose sponge without additional added alcohol (RLU) |
| Day 1 | 1087123 | 97308 |
| Day 3 | 1823654 | 86710 |
| Day 5 | 2765720 | 70641 |

As shown in Table 3, the cell survival rate was detected by a luminescent reagent. Good cell growth was found in the cellulose sponge with additionally added alcohol and the cell count increased day by day, an indication of continued cell growth. Cell growth in the cellulose sponges according to the present invention but without additionally added alcohol was significantly poor on the first day, and the poor cell growth continued subsequently. Therefore, the cellulose sponge with additionally added alcohol of the present invention provided a good environment for cells growth.

What is claimed is:

1. A method for preparing a cellulose sponge, comprising:
   (A) dissolving a hydroxypropyl cellulose in dimethylformamide to form a hydroxypropyl cellulose solution;
   (B) dissolving a compound comprising a self-crosslinkable substituent in dimethylformamide and slowly adding it drop by drop into the hydroxypropyl cellulose solution;
   (C) adding an alcohol for reaction;
   (D) reacting and drying at room temperature to form a hydroxypropyl cellulose having the self-crosslinkable substituent;
   (E) providing a solution of hydroxypropyl cellulose having the self-crosslinkable substituent and placing it in a glass tube;
   (F) adding an initiator and a catalyst into the solution of hydroxypropyl cellulose having the self-crosslinkable substituent for crosslinking; and
   (G) placing the glass tube in low temperature for reaction to form the cellulose sponge,
   wherein the low temperature is −20° C.

2. The method of claim 1, wherein the compound comprising a self-crosslinkable substituent comprises allyl isocyanate, methacrylic acid, acrylic acid, or glycidyl methacrylate.

3. The method of claim 1, wherein the volume of the alcohol is 1.5-50% of the total volume of the dimethylformamide.

4. The method of claim 1, wherein the volume of the alcohol is 7.5-40% of the total volume of the dimethylformamide.

5. The method of claim 1, wherein the volume of the alcohol is 10-35% of the total volume of the dimethylformamide.

6. The method of claim 1, wherein the alcohol is methanol, ethanol, propanol or butanol.

7. The method of claim 1, wherein the initiator is persulfate initiator.

8. The method of claim 7, wherein the persulfate initiator comprises sodium persulfate, ammonium persulfate or potassium persulfate.

9. The method of claim 1, wherein the catalyst is organic amine catalyst.

10. The method of claim 9, wherein the organic amine catalyst comprises N,N,N',N'-tetramethylethylenediamine, N,N,N',N'-tetrakis(2-hydroxypropyl)ethylenediamine, N,N,N',N'-tetramethyl-3-(10H-phenothiazin-10-yl)-1,2-propanediamine, N,N,N',N'-tetramethylpregn-5-ene-3β,20α-diamine, N,N,N',N'-tetramethyl-1,4-butanediamine, 4,4'-tetramethyldiaminodiphenylmethane, N,N,N',N'-tetramethyl-1,4-benzenediamine or N,N,N',N'-tetramethyl-1,4-napthalenediamine.

* * * * *